United States Patent [19]
Jeffers, Sr.

[11] Patent Number: 4,995,327
[45] Date of Patent: Feb. 26, 1991

[54] SEED PLANTING APPARATUS

[76] Inventor: Walter L. Jeffers, Sr., 1507 Enfinger Rd., Pace, Fla. 32571

[21] Appl. No.: 475,388

[22] Filed: Feb. 5, 1990

[51] Int. Cl.$^5$ ............................ A01C 7/02; B67D 5/64
[52] U.S. Cl. ........................................ 111/82; 111/92; 111/106; 221/185; 222/175
[58] Field of Search ............... 111/106, 115, 116, 117, 111/7.1, 92, 82, 99, 130; 220/23.8, 356; 221/155, 185, 186; 206/199; 222/160, 175, 608; 239/653

[56] References Cited

U.S. PATENT DOCUMENTS

| | | | |
|---|---|---|---|
| 337,390 | 3/1886 | Fries | 239/653 X |
| 757,645 | 4/1904 | Bassett | 222/175 |
| 952,252 | 3/1910 | Ingram | 222/175 |
| 1,569,157 | 1/1926 | Thompson | 206/199 X |
| 2,171,037 | 8/1939 | Mahurin | 111/92 |
| 2,221,177 | 11/1940 | Berenson et al. | 220/356 |
| 2,992,501 | 7/1961 | Douglas | 220/23.8 |
| 4,736,694 | 4/1988 | Kratky et al. | 111/106 |
| 4,747,357 | 5/1988 | Kucera | 111/92 X |

FOREIGN PATENT DOCUMENTS

| | | | |
|---|---|---|---|
| 953059 | 11/1949 | France | 111/82 |
| 513112 | 2/1955 | Italy | 222/175 |
| 220463 | 5/1968 | Sweden | 220/23.8 |
| 554089 | 6/1943 | United Kingdom | 222/175 |

*Primary Examiner*—Danton D. DeMille
*Attorney, Agent, or Firm*—Leon Gilden

[57] ABSTRACT

An apparatus including a planar support tray mounting a series of seed containers therethrough. The containers may optionally include a removable lid providing a lip to contain seed within the containers. Further, a funnel integrally secured to the support defines an axis orthogonally aligned relative to the support and in communication with an elongate conduit directed downwardly, with a link member orthogonally mounted to the conduit, with the link member integrally mounted at its other end to an arcuate, concave leg brace, wherein the leg brace may optionally include a flexible strap member for securement about the leg to assist in securing and aligning the organization in use. A plurality of further straps secure the organization about the waist and neck of an individual.

3 Claims, 4 Drawing Sheets

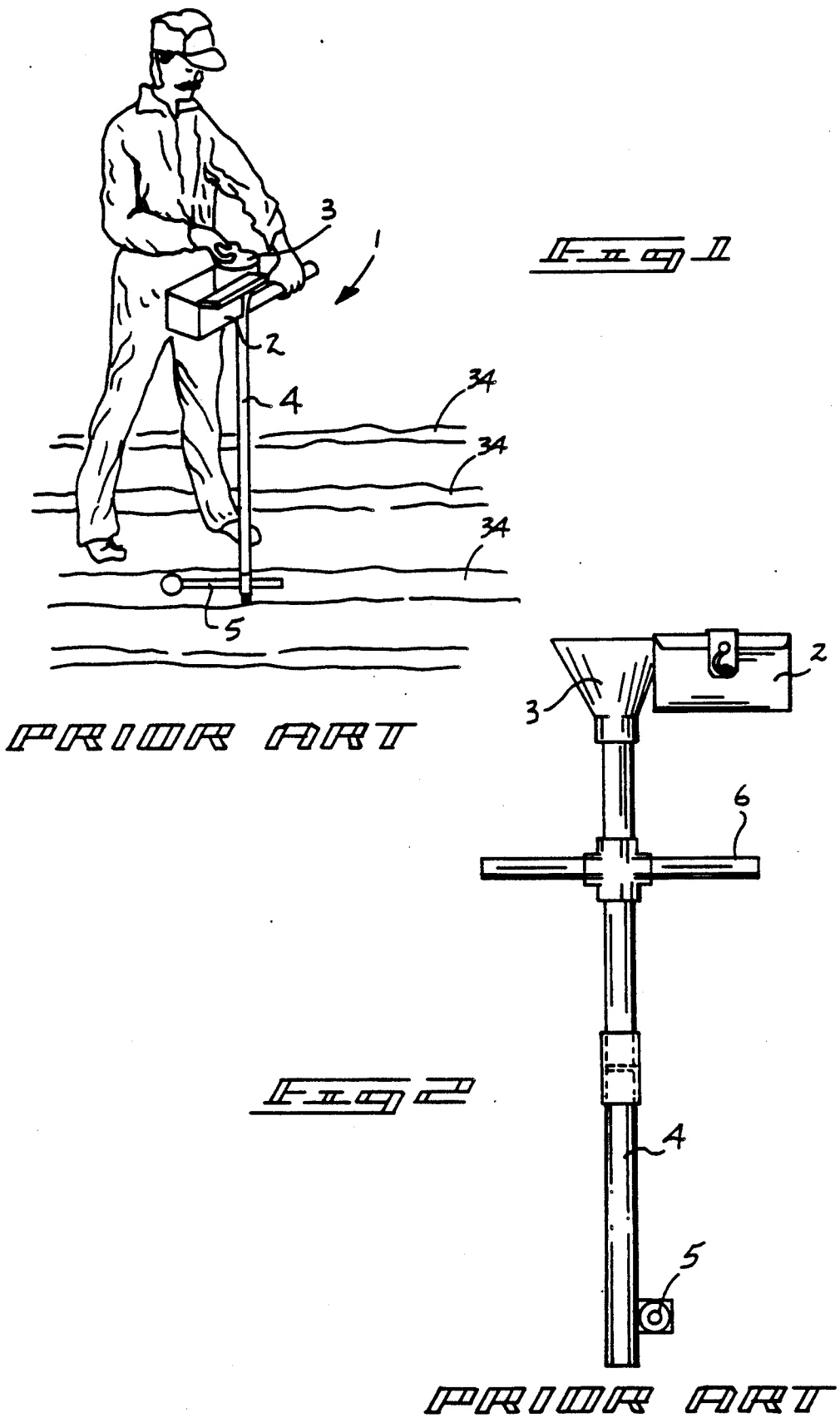

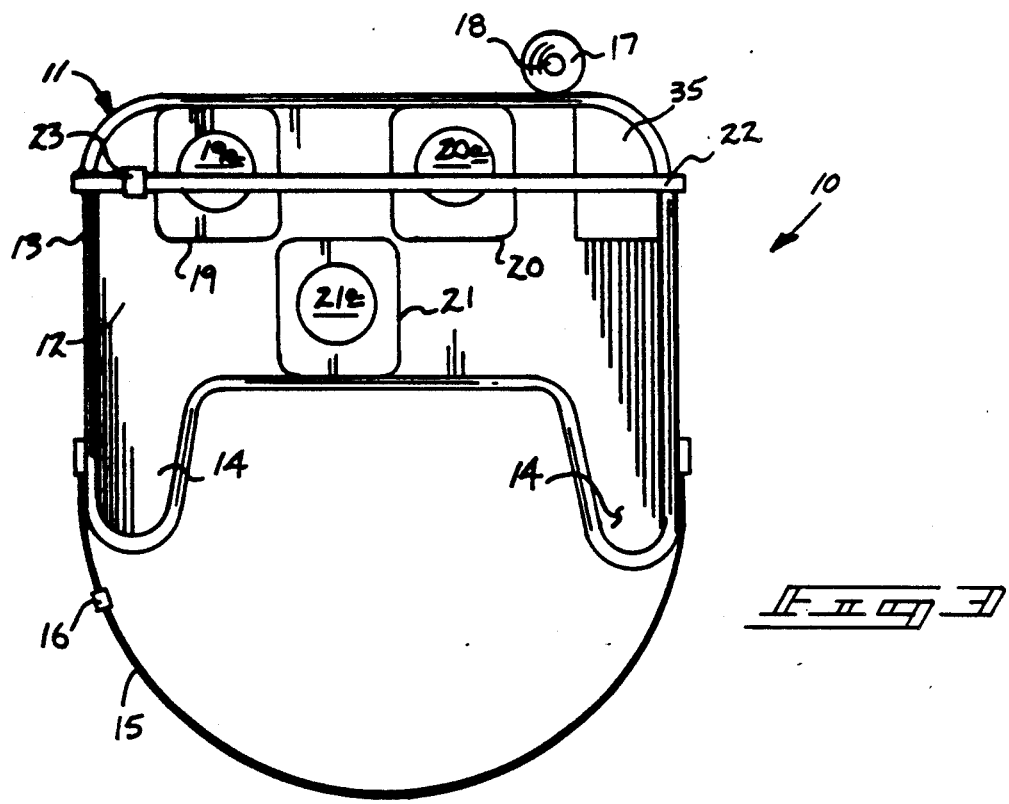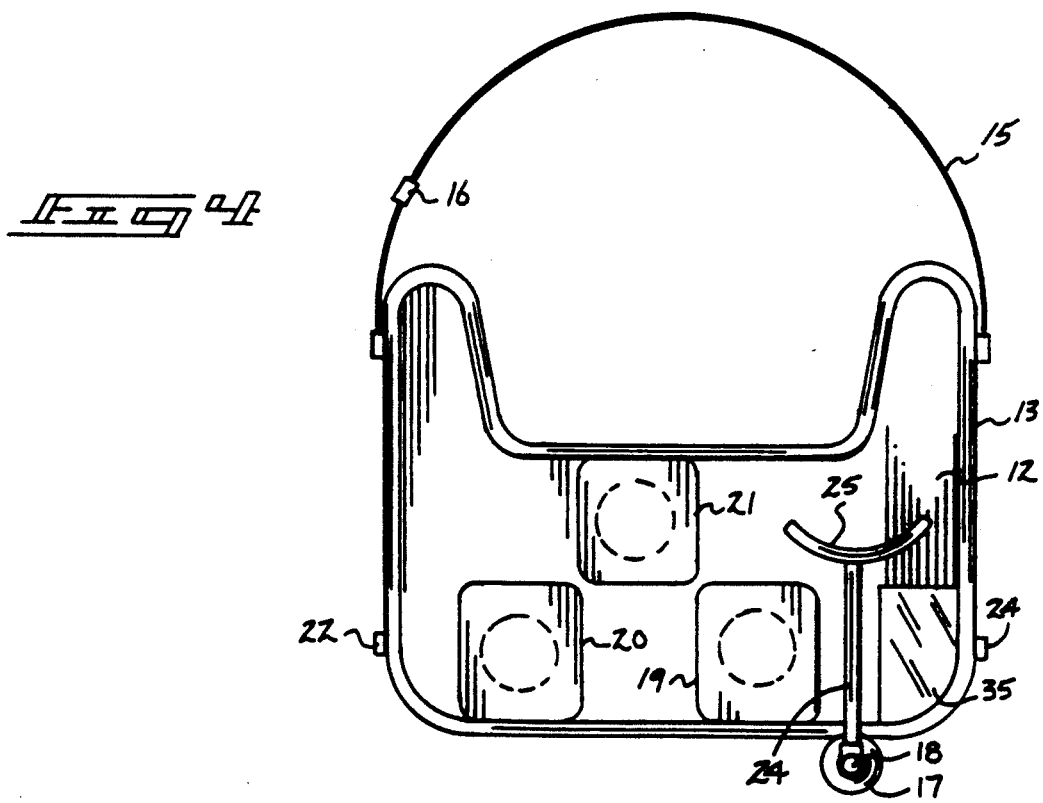

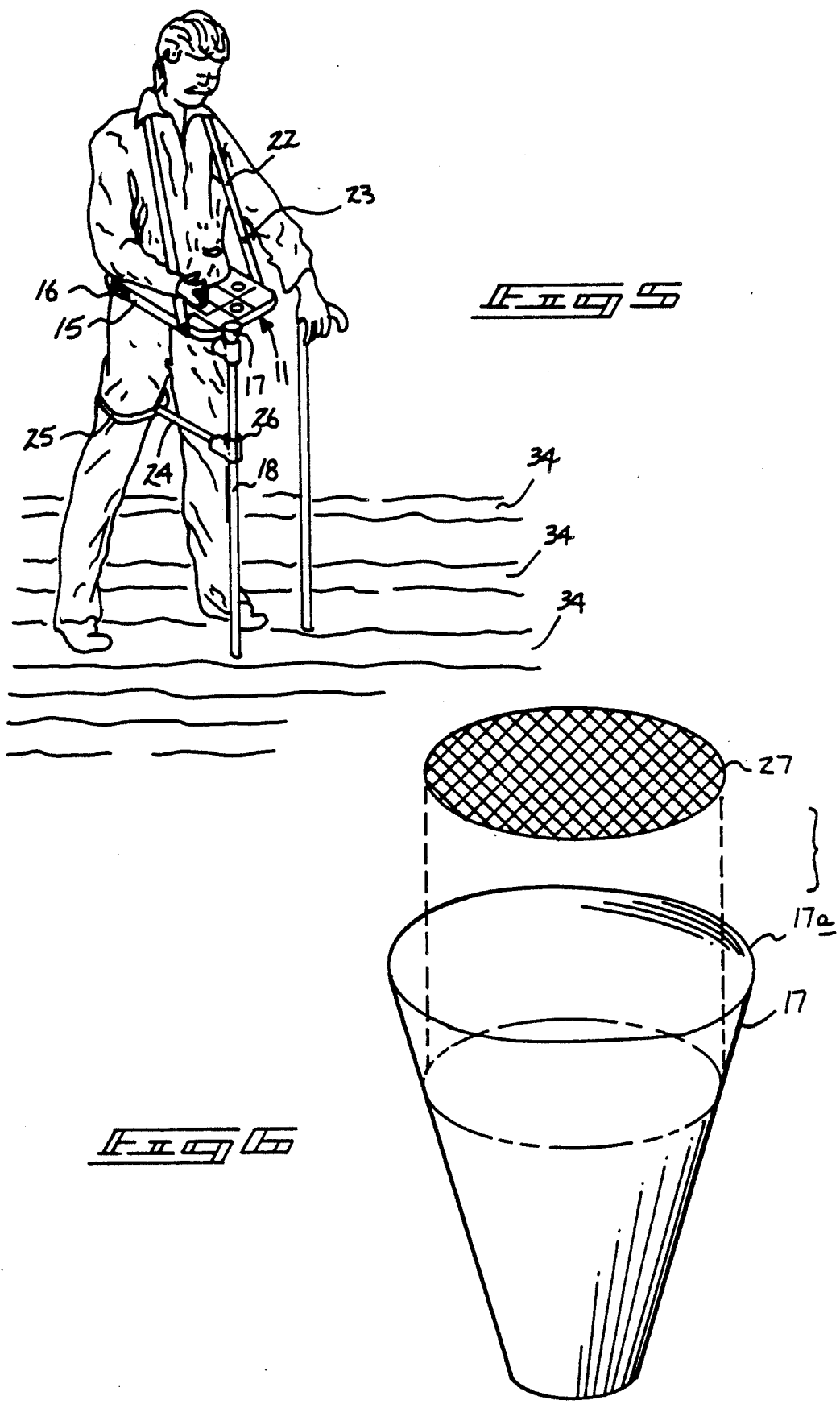

SEED PLANTING APPARATUS

BACKGROUND OF THE INVENTION

1. Field of the Invention

The field of the invention relates to seed planting apparatus, and more particularly pertains to a new and improved manually supported and transported seed planting apparatus wherein the same is readily secured to an individual to effect positioning of seeds at predetermined positions within a prepared field.

2. Description of the Prior Art

The prior art has provided a variety of various seed positioning apparatus for transport and positioning of seed about a furrowed field for planting of such seed by an individual. The prior art has heretofore failed to provide a compact organization readily secured to an individual for convenient transport and positioning of seed throughout a furrowed field. Examples of the prior art include U.S. Pat. No. 4,218,981 to Kelly wherein the same sets forth a seed storage magazine with a funnel mounted adjacent the magazine, with the funnel associated with a downwardly depending conduit and a depth gauge mounted to a lowermost end of the conduit for determining of proper seed planting depth.

U.S. Pat. No. 4,760,807 to Keller sets forth a hand operative seed planter including an elongate tubular body, with a pressure plate displaceable at a lowermost end of the body to selectively allow a directing of seed therethrough.

Similarly, U.S. Pat. No. 4,694,760 to Camp provides an elongate hollow body with a trigger mechanism at an upper end of the body to enable directing of seed to a lowermost end of the body, as desired by an individual.

U.S. Pat. 4,074,461 to Hirschman provide a plant support apparatus of interest relative to the linkage utilized in a support mechanism.

U.S. Pat. No. 4,011,612 to Atkinson sets forth a seed planting implement defining an elongate tube mounted underlying a tool for use in plant cultivation to provide a convenient accessory in association with the tool.

As such, it may be appreciated that there is a continuing need for a new and improved seed planting apparatus wherein the same is conveniently secured to an individual and transported thereby for use in a planting procedure and in this respect, the present invention substantially fulfills this need.

SUMMARY OF THE INVENTION

In view of the foregoing disadvantages inherent in the known types of seed planting apparatus now present in the prior art, the present invention provides a seed planting apparatus wherein the same is readily secured to an individual to enable transport thereof during a seed planting procedure. As such, the general purpose of the present invention, which will be described subsequently in greater detail, is to provide a new and improved seed planting apparatus which has all the advantages of the prior art seed planting apparatus and none of the disadvantages.

To attain this, the present invention provides an apparatus including a planar support tray mounting a series of seed containers therethrough. The containers may optionally include a removable lid providing a lip to contain seed within the containers. Further, a funnel integrally secured to the support defines an axis orthogonally aligned relative to the support and in communication with an elongate conduit directed downwardly, with a link member orthogonally mounted to the conduit, with the link member integrally mounted at its other end to an arcuate, concave leg brace, wherein the leg brace may optionally include a flexible strap member for securement about the leg to assist in securing and aligning the organization in use. A plurality of further straps secure the organization about the waist and neck of an individual.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved seed planting apparatus which has all the advantages of the prior art seed planting apparatus and none of the disadvantages.

It is another object of the present invention to provide a new and improved seed planting apparatus which may be easily and efficiently manufactured and marketed.

It is a further object of the present invention to provide a new and improved seed planting apparatus which is of a durable and reliable construction.

An even further object of the present invention is to provide a new and improved seed planting apparatus which is susceptible of a low cost of manufacture with regard to both materials and labor, and which accordingly is then susceptible of low prices of sale to the consuming public, thereby making such seed planting apparatus economically available to the buying public.

Still yet another object of the present invention is to provide a new and improved seed planting apparatus which provides in the apparatuses and methods of the prior art some of the advantages thereof, while simultaneously overcoming some of the disadvantages normally associated therewith.

Still another object of the present invention is to provide a new and improved seed planting apparatus wherein the same provides plural securement and mounting means to secure and stabilize the apparatus about in torso of an individual.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art seed planting apparatus.

FIG. 2 is an orthographic view taken in elevation of the seed planting apparatus of FIG. 1.

FIG. 3 is a top orthographic view of the instant invention.

FIG. 4 is a bottom orthographic view of the instant invention.

FIG. 5 is an isometric illustration of the instant invention secured to an individual.

FIG. 6 is an isometric illustration of a modified funnel organization utilized by the instant invention.

DESCRIPTION OF THE PREFERRED EMBODIMENT

Figure 7:
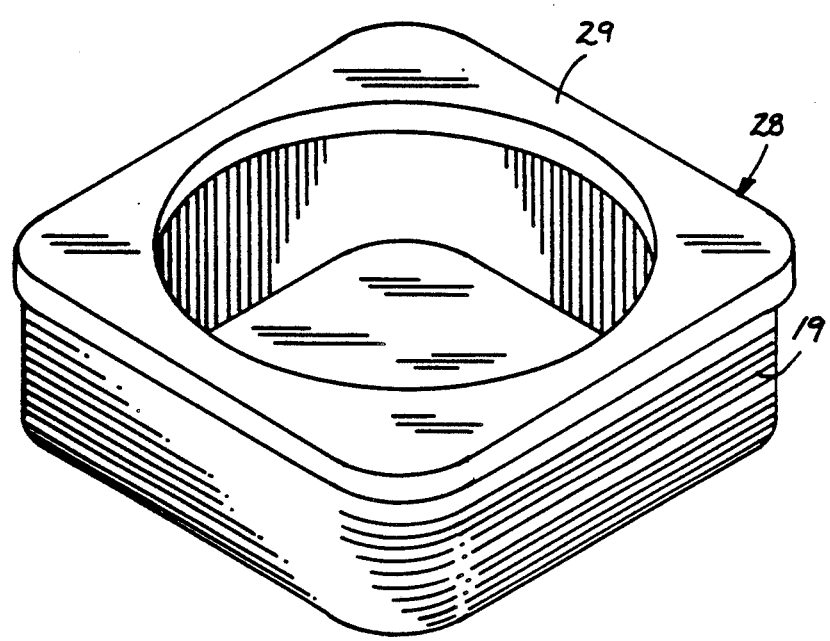
FIG. 7 is an isometric illustration of a typical seed container utilized by the instant invention.

With reference now to the drawings, and in particular to FIGS. 1 to 8 thereof, a new and improved seed planting apparatus embodying the principles and concepts of the present invention and generally designated by the reference numeral 10 will be described.

FIG. 1 is illustrative of a typical prior art planting apparatus 1 utilizing a hopper 2 for storage of seeds therewithin that are directed through a funnel 3 and an aligned conduit 4 for positioning within various furrows 34 within a prepared ground for planting, with a depth gauge 5 mounted adjacent a lowermost end of the conduit 4. FIG. 2 illustrates the apparatus 1 with a generally "T" shaped handle 6 directed about the conduit 4 for manual grasping of the organization during transport thereof.

Most specifically, the seed planting apparatus 10 of the instant invention essentially comprise "C" shaped tray 11 defined by a planar support surface 12 formed with a perimeter rim 13 directed upwardly about the support surface of prevent inadvertent spillage of seeds directed on the support surface during transport thereof. The "C" shaped tray 11 is formed with legs 14 for securement and positioning about a torso of an individual during transport of the organization, as illustrated in FIG. 5 for example.

A flexible waist strap 15 is mounted to exterior surfaces of the tray 11 to the perimeter rim 13, with a waist strap bucke 16 mounted for adjustment to accommodate various torso configurations of individuals. A further strap comprising a neck strap 22 is mounted adjacent a forward end of the tray 11 utilizing a neck strap buckle 23 for adjustment and mounting of the tray in a suspended relationship from an individual's neck, as illustrated in FIG. 5.

A funnel 17, whose axis lies generally orthogonally relative to the planar support surface 12 is integrally mounted to a forward edge of the tray 11 and in communication with a coaxially aligned and integrally mounted elongated conduit 18 to direct seed from the funnel 17 to an associated furrow 34. Mounted and directed through the support surface 12 are a series of containers comprising a first container 19, a second container 20, and a third container 21 to provide a variety of seeds as is typically utilized in a planting situation to provide a selective combination of seeds to be directed into individual furrows. Each container includes a reservoir defined by a respective reservoir 19a, 20a and 21a formed within each container.

A horizontal link 24 is orthogonally and fixedly mounted to the conduit 18 by a sleeve 26. The horizontal link 24 is fixedly mounted to the sleeve at one end and to an arcuate concave leg rest 25 at its other end, wherein the leg rest 25 is fixedly mounted medially of its exterior surface to the forward end of the link 24, as illustrated in FIG. 4 for example.

FIG. 6 is illustrative of the funnel 17 defined by an upper end 17a defining a predetermined diameter, with a screen 27 of a predetermined mesh size defined by a screen diameter of less than that defined by the funnel diameter at 17a. The openings within the screen 27 permit a selective rate of seed descent through the funnel 17, and subsequently through the conduit 18 into a furrow 34, to more carefully meter the rate of seed presentation within the furrows 34. Further, FIG. 7 illustrates a typical seed container 19 including a removable flexible lid 28 mounted thereto defined by a surrounding lip 29 formed about a central opening to minimize seed spillage from an associated container, while removal of the lid 28 permits a rapid filling of each container subsequent to use of the apparatus.

Figure 8:
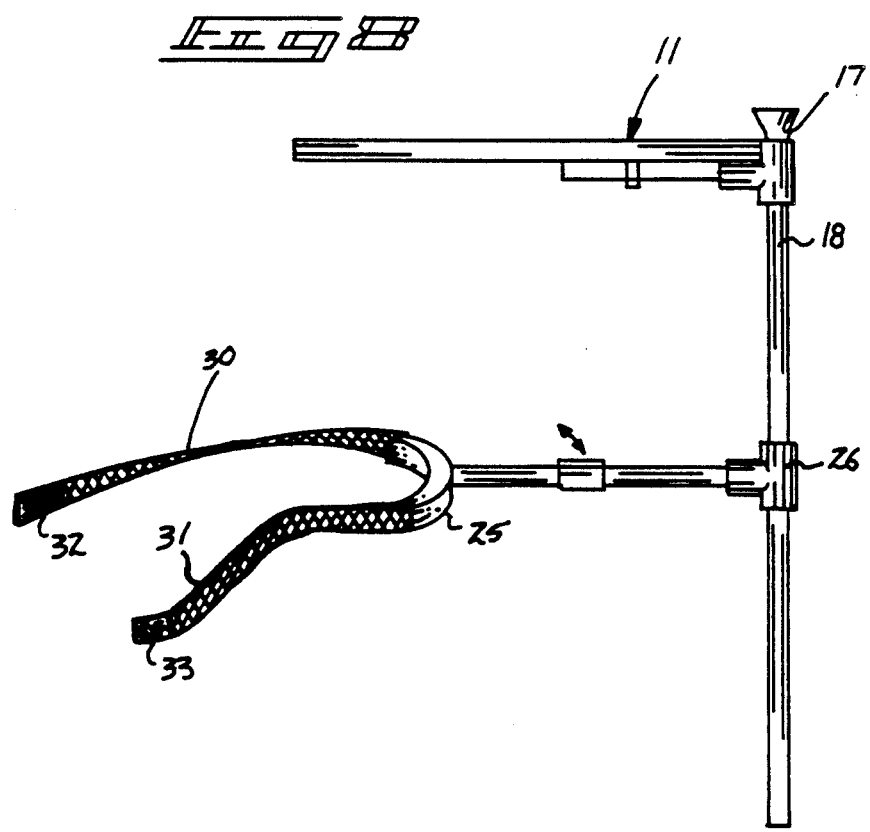
FIG. 8 is an orthographic side view taken in elevation of a modified securement organization utilized by the instant invention.

FIG. 8 is illustrative of the arcuate concave leg rest 25 formed with a flexible first and second leg strap 30 and 31 mounted to respective opposite ends of the leg rest 25. The first and second flexible straps each include a respective first and second hook and loop fastener patch 32 and 33 for rapid and secure mounting of the leg rest 25 about an individual's leg to provide an added degree of selective securement of the organization to an individual.

A transparent viewing window 35 is mounted through the support surface 12 and positioned adjacent the funnel 17 and associated conduit for an individual to readily observe and appreciate proper positioning and deposit of seeds directed through the conduit.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A seed planter apparatus comprising,
    a support tray including a plurality of seed storage containers mounted thereto for storage of a variety of selective seeds within the containers, and
    a flexible securement means for securement of the tray to an individual, and
    a funnel member integrally mounted to the tray defined by a funnel axis, wherein the axis is oriented orthogonally relative to the storage tray, and
    an elongate conduit directed downardly from the funnel in an axial alignment and communicating with the funnel, and
    wherein the support tray defines a planar support surface including an upstanding perimeter rim extending upwardly of the surface to prevent inadvertent spillage of seeds from the support surface, and the support tray defined by a generally "C" shaped configuration to receive a torso of the individual therewithin, wherein the "C" shaped configuration is defined by spaced legs of the tray, and
    wherein the flexible securement means include a first torso strap mounted to exterior surfaces of the legs, wherein the torso strap includes a buckle for adjustment thereof, and the securement means include a flexible neck strap secured adjacent a forward end of the support tray, with a neck strap buckle for adjustment of the neck strap, and
    wherein each of the containers is mounted integrally to and extends above support surface of the support tray, and wherein each container includes a flexible cover releasably mounted thereto, wherein the cover includes a lip defining a central opening, wherein the lip restricts loss of seed from a respective container when secured thereto, and
    further including a horizontal link integrally and orthogonally mounted to the elongate conduit, and the horizontal link mounted to the elongate conduit at a forward terminal end, and a rear terminal end of the horizontal link mounted medially and integrally to a rear surface of an arcuate concave leg rest.

2. An apparatus as set forth in claim 1 wherein the flexible securement means includes a further flexible securement strap, wherein the further flexible securement strap includes a first and second strap member mounted to opposed terminal ends of the arcuate concave leg rest, and each of the first and second flexible straps includes a respective first and second hook and loop fastener patch integrally formed to a free end thereof for securement of the leg rest about an individual's leg.

3. An apparatus as set forth in claim 2 further including a transparent window mounted in the planar support surface for visual observation of a lower terminal end of the elongate conduit for an individual to ascertain proper positioning of seeds directed through the conduit into an associated furrow.

* * * * *